US009969081B2

(12) United States Patent
Lacaze et al.

(10) Patent No.: US 9,969,081 B2
(45) Date of Patent: May 15, 2018

(54) METHOD AND SYSTEM FOR THE DIRECTED CONTROL OF ROBOTIC ASSETS

(71) Applicants: Alberto Daniel Lacaze, Potomac, MD (US); Karl Murphy, Rockville, MD (US); Steven Anthony Legowik, Charles Town, WV (US); Shima Rayej, Bethesda, MD (US)

(72) Inventors: Alberto Daniel Lacaze, Potomac, MD (US); Karl Murphy, Rockville, MD (US); Steven Anthony Legowik, Charles Town, WV (US); Shima Rayej, Bethesda, MD (US)

( * ) Notice: Subject to any disclaimer, the term of this patent is extended or adjusted under 35 U.S.C. 154(b) by 0 days. days.

(21) Appl. No.: 13/952,542

(22) Filed: Jul. 26, 2013

(65) Prior Publication Data
US 2014/0058563 A1    Feb. 27, 2014

Related U.S. Application Data

(60) Provisional application No. 61/676,475, filed on Jul. 27, 2012.

(51) Int. Cl.
*G05B 19/418* (2006.01)
*B25J 9/16* (2006.01)
*G05D 1/02* (2006.01)

(52) U.S. Cl.
CPC ............ *B25J 9/162* (2013.01); *G05D 1/0274* (2013.01); *G05D 1/0278* (2013.01); *G05D 1/0295* (2013.01); *G05D 2201/0213* (2013.01)

(58) Field of Classification Search
CPC .. G05D 1/0295; G05D 1/0278; G05D 1/0274; G05D 2201/0209; G05D 1/0033; G05D 1/027; G05D 1/0293; B60W 2550/10; B60W 2750/40; B60W 2050/008
USPC ........ 700/248, 253, 258; 701/409, 410, 411, 701/412, 446, 454
See application file for complete search history.

(56) References Cited

U.S. PATENT DOCUMENTS 5,899,955 A * 5/1999 Yagyu .................. G08G 1/0969
340/988
6,128,559 A * 10/2000 Saitou ..................... B61L 23/34
340/436

(Continued)

*Primary Examiner* — Khoi H Tran
*Assistant Examiner* — Jorge O Peche
(74) *Attorney, Agent, or Firm* — White-Welker & Welker, LLC; Matthew T. Welker, Esq.

(57) ABSTRACT

Static multi-registration performs a delayed convoy mission from a recorded path. The data recorded for delayed convoy includes both positions traversed by the vehicle and the obstacles sensed as it drove along the path and generates a new path file in this format that is used by the vehicle to follow the desired route. The data is processed before it is passed to the vehicle to be followed. Paths are processed to determine where they cross each other. These intersection points and the path data are used to create an interconnected graph of path segments. A multi-registration planner uses that information on the length and directionality of the path segments to compute the best route between two intersections. The route generated by the planner guides the merging of position and obstacle data from several recorded paths into a single record used by the vehicle to follow the desired route.

14 Claims, 5 Drawing Sheets

(56) References Cited

U.S. PATENT DOCUMENTS

| | | | | |
|---|---|---|---|---|
| 6,411,898 B2* | 6/2002 | Ishida | G01C 21/3697 | 340/436 |
| 6,640,164 B1* | 10/2003 | Farwell | G05D 1/0278 | 180/168 |
| 7,211,980 B1* | 5/2007 | Bruemmer | G05D 1/0246 | 318/567 |
| 7,584,020 B2* | 9/2009 | Bruemmer | G06N 3/008 | 318/567 |
| 7,587,260 B2* | 9/2009 | Bruemmer | G05D 1/0088 | 318/567 |
| 7,974,738 B2* | 7/2011 | Bruemmer | G05D 1/0088 | 318/568.12 |
| 8,271,132 B2* | 9/2012 | Nielsen | B25J 9/161 | 318/568.17 |
| 8,315,789 B2* | 11/2012 | Dunbabin | G05D 1/0274 | 340/436 |
| 9,031,725 B1* | 5/2015 | DiEsposti | G01C 21/20 | 701/22 |
| 9,070,236 B1* | 6/2015 | DiEsposti | G07C 5/0808 | |
| 9,205,886 B1* | 12/2015 | Hickman | G05D 1/0246 | |
| 9,518,830 B1* | 12/2016 | Breed | G01C 21/30 | |
| 2004/0210358 A1* | 10/2004 | Suzuki | G08G 1/0962 | 701/23 |
| 2006/0146719 A1* | 7/2006 | Sobek | G01C 21/20 | 370/238 |
| 2007/0193798 A1* | 8/2007 | Allard | B60T 7/22 | 180/169 |
| 2008/0009964 A1* | 1/2008 | Bruemmer | G05D 1/0088 | 700/245 |
| 2008/0009965 A1* | 1/2008 | Bruemmer | G05D 1/0088 | 700/245 |
| 2008/0009966 A1* | 1/2008 | Bruemmer | G06N 3/008 | 700/245 |
| 2008/0009967 A1* | 1/2008 | Bruemmer | G05D 1/0088 | 700/245 |
| 2008/0009969 A1* | 1/2008 | Bruemmer | G06N 3/008 | 700/245 |
| 2008/0009970 A1* | 1/2008 | Bruemmer | G05D 1/0088 | 700/245 |
| 2009/0030612 A1* | 1/2009 | Hayashi | G01C 21/165 | 701/472 |
| 2009/0079839 A1* | 3/2009 | Fischer | G01S 7/003 | 348/218.1 |
| 2009/0234499 A1* | 9/2009 | Nielsen | B25J 9/161 | 700/250 |
| 2010/0049374 A1* | 2/2010 | Ferrin | G05D 1/0227 | 701/1 |
| 2010/0063652 A1* | 3/2010 | Anderson | A61B 5/02055 | 701/2 |
| 2010/0063663 A1* | 3/2010 | Tolstedt | G05D 1/0231 | 701/23 |
| 2010/0094481 A1* | 4/2010 | Anderson | G05D 1/0295 | 701/1 |
| 2010/0094499 A1* | 4/2010 | Anderson | G05D 1/0295 | 701/23 |
| 2010/0094538 A1* | 4/2010 | Machino | G01C 21/3461 | 701/533 |
| 2010/0217513 A1* | 8/2010 | Takeda | G01C 21/343 | 701/532 |
| 2010/0228470 A1* | 9/2010 | Sakakibara | G01C 21/32 | 701/532 |
| 2010/0256852 A1* | 10/2010 | Mudalige | G08G 1/163 | 701/24 |
| 2010/0305854 A1* | 12/2010 | Kammel | A01D 34/008 | 701/469 |
| 2011/0054689 A1* | 3/2011 | Nielsen | G05D 1/0088 | 700/258 |
| 2011/0112730 A1* | 5/2011 | Rekow | G05D 1/0219 | 701/50 |
| 2012/0092173 A1* | 4/2012 | Sanchez | A61B 3/113 | 340/576 |
| 2012/0095638 A1* | 4/2012 | Anderson | A01D 43/06 | 701/23 |
| 2012/0221168 A1* | 8/2012 | Zeng | G08G 1/09626 | 701/1 |
| 2012/0323432 A1* | 12/2012 | Wong | G01C 21/206 | 701/25 |
| 2013/0107669 A1* | 5/2013 | Nickolaou | G01C 21/30 | 367/125 |
| 2014/0070944 A1* | 3/2014 | Lacaze | G08B 1/08 | 340/539.13 |
| 2016/0170028 A1* | 6/2016 | Gong | G01S 19/23 | 342/357.62 |
| 2017/0249809 A1* | 8/2017 | Lacaze | G08B 1/08 | |

* cited by examiner

METHOD AND SYSTEM FOR THE DIRECTED CONTROL OF ROBOTIC ASSETS

CROSS REFERENCE TO RELATED APPLICATIONS

This application claims priority from U.S. patent application Ser. No. 61/676,475, entitled "Method and system for the directed control of robotic assets", filed on 27 Jul. 2012. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to a method and system for the directed control of robotic assets. More specifically, the present invention relates to precision vehicle navigation with a GPS-based system augmented with a high-resolution relative navigation system.

BACKGROUND OF THE INVENTION

In an unconstrained environment, the precise and repeatable determination of the vehicle's position is a non-trivial problem. The typical solution to determining global vehicle position is to use GPS. Without differential corrections GPS has position errors in the tens of meters. Where WAAS differential corrections are available, GPS position error can be reduced to a few meters. To get down to sub-meter accuracy, the use of differential and phase-differential GPS corrections are necessary. One problem with differential GPS is its general availability. It is necessary to have a differential base station located in the area of operation, which can be impractical or impossible at times.

Other factors that degrade the suitability of GPS for precision vehicle-position sensing are RF multi-path and occlusion issues. GPS relies on RF signals from satellites orbiting the earth. The position of the GPS receiver is determined by very precise measurements of the distance between the visible satellites and the receiver. In obstructed areas such as urban environments and heavily wooded areas the signals from the satellites can be blocked from sight. An accurate position cannot be computed unless enough satellites can be seen by the receiver.

The accuracy of the position solution can also be compromised if the signals from the satellites reach the receiver by an indirect route, for example by bouncing off of buildings. In this case the distances to the satellites will be incorrect, and the resulting position calculated from these measurements will be in error. Another complicating factor is vehicle speed. Typically GPS units provide better results when they are stationary. However, even with its limitations, GPS is the best method for determining global vehicle position.

SUMMARY OF THE INVENTION

The current implementation of static multi-registration makes use of the existing functionality to perform a delayed convoy mission from a recorded path. The data recorded for delayed convoy includes both positions traversed by the vehicle and the obstacles sensed as it drove along the path. The static multi-registration code generates a new path file in this format that is used by the vehicle to follow the desired route. The end goal is to have a system that can database information about paths traversed by any number of vehicles and make it available automatically to improve navigation in areas that have been previously visited by the robots.

The data from a number of paths is processed in a number of steps before it is passed to the vehicle to be followed. First the paths are processed to determine where they cross each other. These intersection points and the path data are used to create an interconnected graph of path segments. The graph is passed to a multi-registration planner that uses information on the length and directionality of the path segments to compute the best route between two intersections. The route generated by the planner is then used to guide the merging of position and obstacle data from several recorded paths into a single record that can be used by the vehicle to follow the desired route.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

For precision vehicle navigation a GPS-based system needs to be augmented with a high-resolution relative navigation system. For simplicity this can be referred to as an inertial navigation system (INS) though non-inertial sensors, such as wheel motion sensors, may be used in generating the navigation solution. GPS update rates are typically too slow to provide dynamic position information for a moving vehicle. An INS can be used to interpolate vehicle position between GPS updates. INS position information is typically available at a much higher rate and at a much finer position resolution than that of a GPS receiver. The drawback of INS position solutions is that they tend to drift with time and/or distance traveled. The more expensive the sensors used, the less drift in the system, but it cannot be completely eliminated. GPS is very stable with respect to time and distance, with the addition of a significant local noise component. INS has a very small local noise component, but drifts over large distances or time intervals. Since GPS and INS based navigation solutions have complimentary error characteristics, hybrid systems can provide very good vehicle navigation solutions. Hybrid INS/GPS vehicle navigation systems are available commercially from a number of vendors, and their price varies with their level of precision.

The importance of the relative navigation solution provided by an INS is often overlooked, even by the makers of high quality vehicle navigation systems. For the purposes of sensor fusion, a good relative position solution is more important than a good global position solution. It is more to know precisely where you are relative to previous sensor measurements than to know where you are globally. In a real time navigation system, the best estimate of the vehicle's global position will change relative to the vehicle's actual position. Just because the best estimate moves does not mean that the vehicle moved, or that the world moved relative to the vehicle.

Figure 1A:
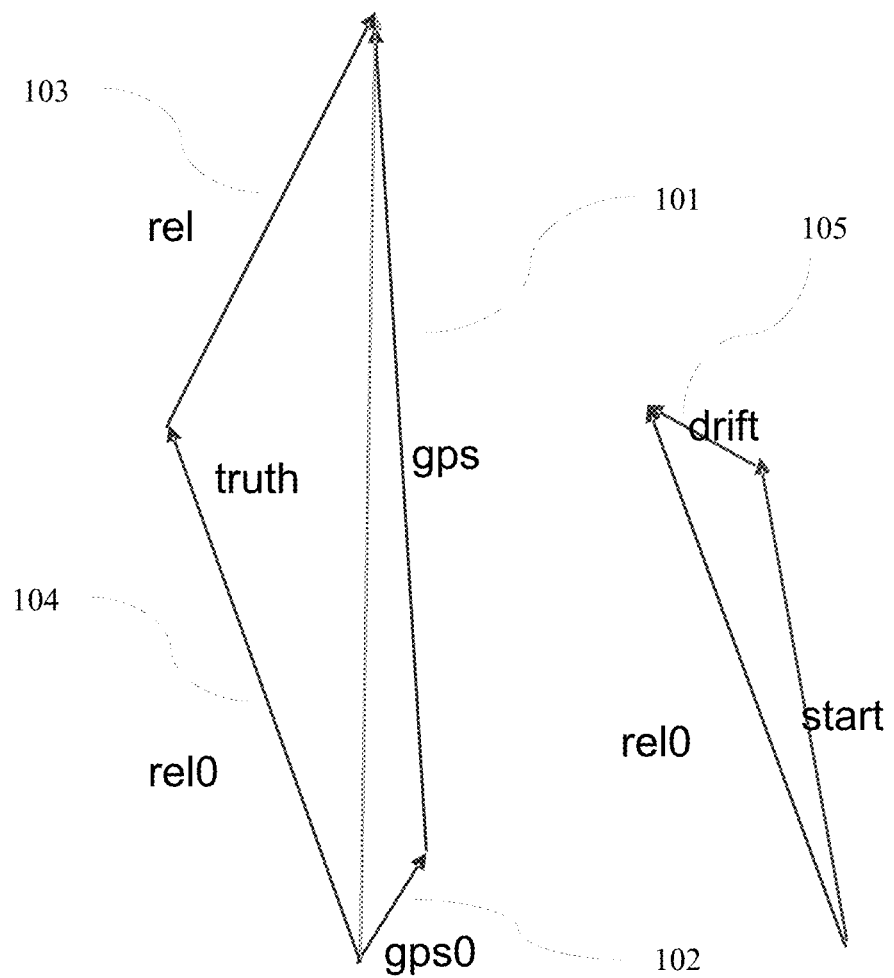
FIG. 1a shows a vector representation of a vehicle's relative and global position solutions.
Figure 1B:
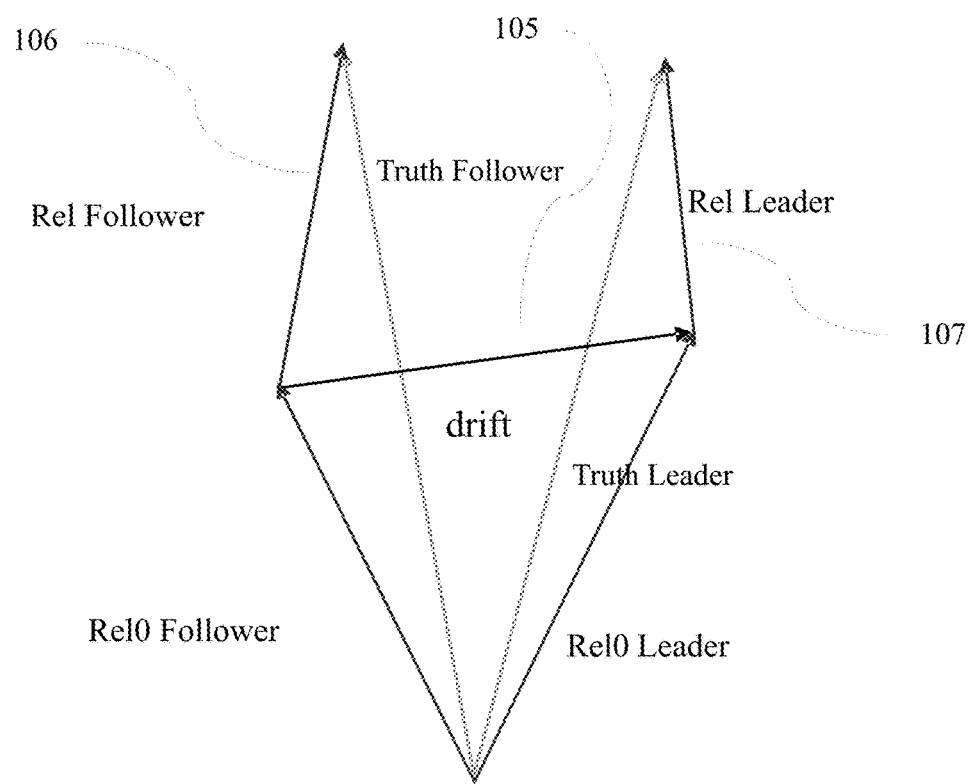
FIG. 1b shows the relative drift between two vehicles.
Figure 2:
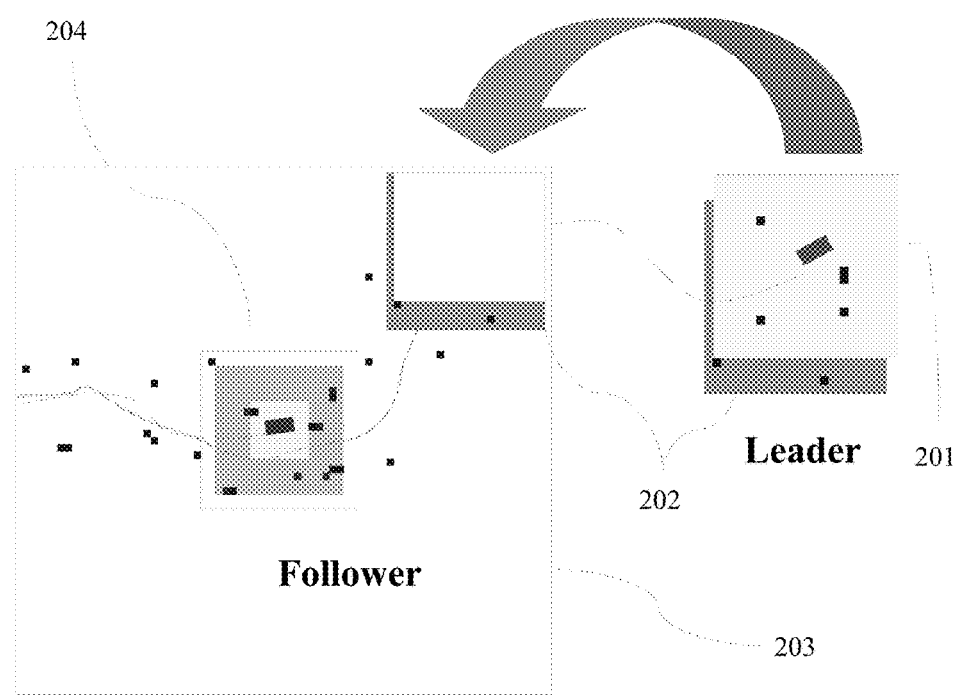
FIG. 2 shows the real-time sharing of the mapette list and the follower's master obstacle map.

The pure relative INS solution is generally better for fusing multiple sensor images. The use of global position solutions has to be done with this in mind. Sensor based registration tracks the relative INS drift by tracking observed features (obstacles), thereby bridging the gap between relative and global position solutions. FIG. 1a shows a vector representation of a vehicle's relative and global position solutions. A vehicle's true position at any given point in time can be represented as a GPS solution 101 plus noise (gps0) 102 or a relative INS solution 103 plus a relative offset (rel0) 104. Drift 105 is the error accumulated by the INS. Relative drift 105 between two vehicles, shown in FIG. 1b, can then be defined as the offset between the leader and follower INS navigation solutions 106 and 107. Sensor-based registration calculates and corrects for this relative drift.

Registration based correction works best when there are many visible features (obstacles) to work with. Map registration helps particularly in high-speed following. The quality of the registration-based corrections can be seriously degraded if there are few or no features to match. A figure of merit for the quality of the registration value can be used by the system to determine how good the registration is. Fortunately, the places where registration typically performs poorly are the areas where GPS does well (open fields), and registration does well when GPS has problems (in heavily wooded areas and among buildings).

The first part of our invention applies to leader-follower applications, where a following vehicle wishes to precisely follow the path of a lead vehicle. Sensor-based registration is used to correct errors between the leader's and follower's path. This registration process consists of two key modules: a registration obstacle server (ROS) to collect maps 201 of features seen by the lead vehicle, and a registration module (REG) on the following vehicle that uses map registration to generate position corrections. The ROS module merges features collected from the sensors and places them in a list in the order in which they will be encountered by the following vehicle. The map features are sent in compressed form, referred to as mapettes 202 in our implementation, to the following vehicle on demand. On the following vehicle the map 203 is reconstructed by the REG module as the follower drives through the same area as the leader. The follower generates its own feature map 204 based on sensor readings. The follower's map is then compared to the reconstructed map from the leader, and an optimal transformation to align the two maps is computed. This process is referred to as 'registering' the maps. This transformation is referred to as the 'drift' between the leader and follower coordinate systems. This drift value is used to transform path points in the leader's relative coordinate frame into the follower's coordinates. The vehicle is then steered to achieve this transformed path. The path and feature data can be used to trace the path of the leader immediately, or the data can be recorded and used to follow the path days or months later.

An extended Kalman filter is used compute a smoothed drift value based on the registration results and the motion of the vehicle detected by the INS. The filtered drift is used in combination with the current INS navigation solution to make an initial estimate of the alignment of the feature maps. This is used to limit the parameter space that needs to be searched in order to find the proper registration between the leader and follower feature maps.

Figure 3:
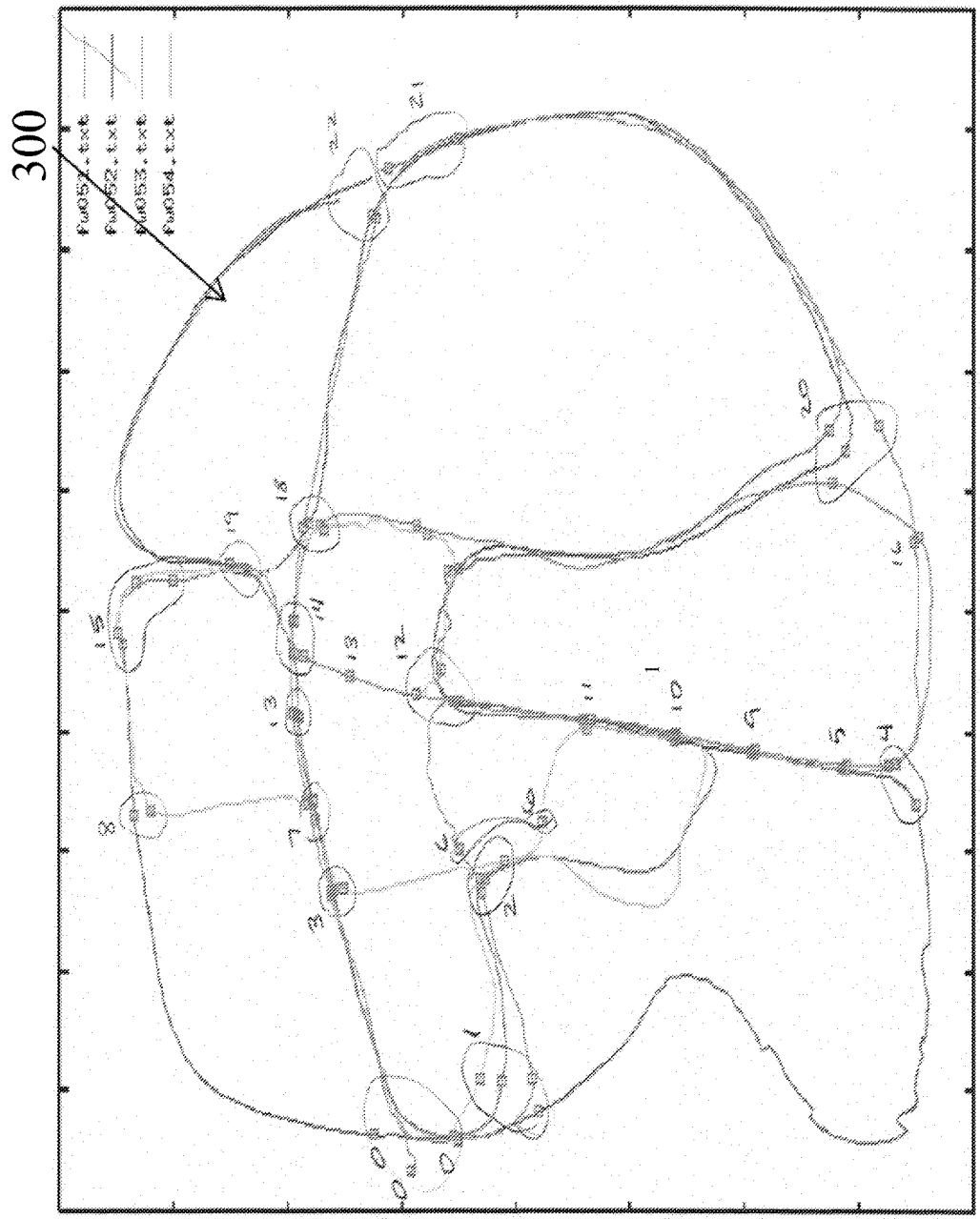
FIG. 3 illustrates multiple intersecting paths and detected intersection points.
Figure 4:
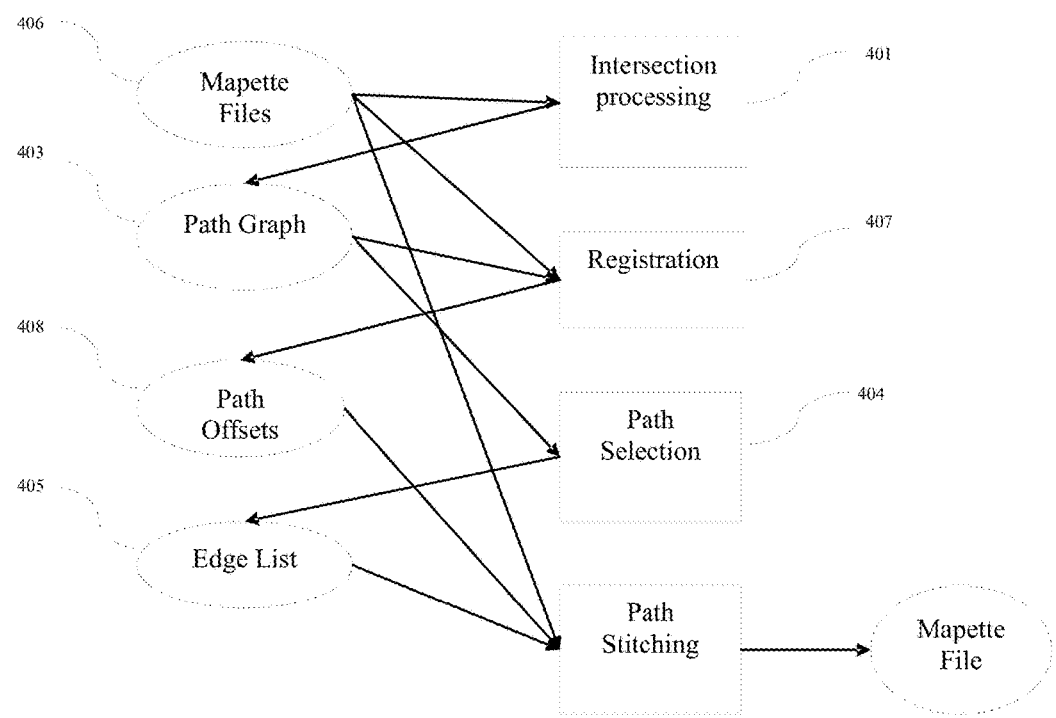
FIG. 4 shows the interaction of the various steps in the static multi-registration process.

Multi-registration extends the functionality of delayed leader-follower registration to encompass a network of interconnected vehicle paths 300, as shown in FIG. 3. Path and feature data are recorded by an exploring vehicle. This data is used by other vehicles later to guide themselves along the recorded paths. Multi-registration allows new composite paths to be generated by merging data from a number of recorded paths. The multi-registration process can be performed either statically or dynamically. In static multi-registration, the planning and feature map construction is done off-line. A static data file containing path and registration feature information generated from segments of the recorded data, and is then sent to the vehicle to be followed in the fashion described for the leader-follower configuration. In dynamic multi-registration the generation of the path is done in real-time on the vehicle. The path planner is run cyclically to respond to changing information and conditions.

Multi-registration makes use of a road network that is generated from data collected by the exploring vehicle, or vehicles. First the paths are processed to determine where they cross each other in an intersection-processing step 401. These intersection points and the path data are used to create an interconnected graph of path segments 403. The graph is passed to a multi-registration planner 404 that uses information on the length and directionality of the path segments to compute the best route. The route generated by the planner 405 is then used to guide the merging of the vehicle paths and feature data 406 from several recorded path. Path to path registration 407 can be done on or off line to compute the transformation 408 needed to map a new segment's path and feature data into the coordinate system of the preceding segment.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for controlling robotic assets comprising the steps of:
   providing a computer server;
   providing a database, stored on the computer server, of previously collected features collected by a robotic asset;
   providing a database, stored on the computer server, containing traversable trajectories defining a road network;
   using a network of features, in real time, to localize a vehicle;
   sensing features of a terrain or an environment by the vehicle where features are defined as any physical attribute, that can be sensed with onboard sensors;
   creating one or more trajectories collected by one or more assets into a single trajectory that is followed by the vehicle;
   using a vehicle navigation system to control the vehicle's movement based on the created trajectory;

generating an interconnected graph, where each segment of the graph can have a different frame and where each segment is connected to other segments by matching features that are sensed by the vehicles in the intersections;

searching through the generated graph to compute the best route;

producing a set of concatenated edges from the generated graph that defines the best route or optimal trajectory;

storing features collected by multiple assets in the database; and using vehicles that are in a GPS-denied area, or in an areas where GPS does not provide sufficient accuracy for driving.

2. The method of claim 1, wherein the feature matching between the feature server and the vehicle is done using mapettes.

3. The method of claim 2, wherein the features within a sensor's range are sent to the vehicle in conjunction with the trajectory of the original asset; and sensor-based registration calculates and corrects for relative drift.

4. The method of claim 3, further comprising a matching algorithm comparing the features on the database and the features sensed at that moment in time to determine an error between any two vehicles; and wherein the first vehicle is the one that collected an original features and the second vehicle is the one that is following the path.

5. The method of claim 4, further comprising a filtering algorithm correcting the navigation solution on the vehicle given a delta pose error.

6. The method of claim 5, further comprising the step of utilizing features collected by multiple assets into a mapette that can be used by a Kalman filtering algorithm to correct a navigation solution.

7. The method of claim 2, wherein the features within a sensor's range of the vehicle are stored on the vehicle itself.

8. The method of claim 7, further comprising a matching algorithm comparing the features on the database and the features sensed at that moment in time to create a delta pose error.

9. The method of claim 8, further comprising a filtering algorithm correcting the navigation solution on the vehicle given the delta pose error.

10. The method of claim 9, further comprising a control algorithm steering the vehicle from its current pose to the trajectory provided from the database and the corrected navigation solution.

11. The method of claim 1, further comprising the step of stringing or concatenating multiple trajectories collected by different assets into a single trajectory that can then be followed by the vehicle.

12. The method of claim 11, further comprising the step of utilizing features collected by multiple assets into a coherent map that can be used by the filtering algorithm to correct a navigation solution.

13. The method of claim 1, further comprising the step of utilizing a search algorithm to calculate a best route through the road network utilizing segments collected by different assets.

14. The method of claim 1, wherein features collected by the vehicle are used to complement the database of features.

* * * * *